United States Patent Office 3,344,147
Patented Sept. 26, 1967

3,344,147
2-(LOWER ALKYL)-3-(LOWER ALKYL)-4-PHENYL-3- OR -4-CYCLOHEXENECARBOXYLIC ACIDS AND DERIVATIVES THEREOF
Alexander Mebane, New York, N.Y., assignor to Ortho Pharmaceutical Corporation, a corporation of New Jersey
No Drawing. Filed Mar. 8, 1966, Ser. No. 532,581
9 Claims. (Cl. 260—326.5)

This application is a continuation-in-part of my application S.N. 265,071, filed Mar. 14, 1963 (now abandoned).

The present invention relates to novel 2-(lower alkyl)-3-(lower alkyl)-4-phenyl-4-cyclohexenecarboxylic acids and 2-(lower alkyl)-3-(lower alkyl)-4-phenyl-3-cyclohexenecarboxylic acids and derivatives thereof.

The compounds of the invention have the following formulae:

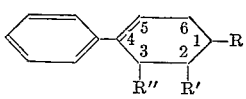

and

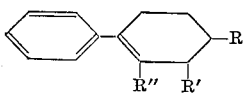

wherein R is selected from the group consisting of formyl, carboxy and substituted carboxy including alkali metal and alkaline earth salts, R' is selected from the group consisting of methyl, dimethyl and ethyl, and R" is selected from the group consisting of methyl and ethyl.

The compounds of the invention are highly active oral antilittering agents in rats, mice, rabbits and dogs fed with a diet containing the compounds. In particular, the compounds of the invention suppress the fertility of female animals.

The reaction sequence for the preparation of the new compounds of the invention may be illustrated as follows:

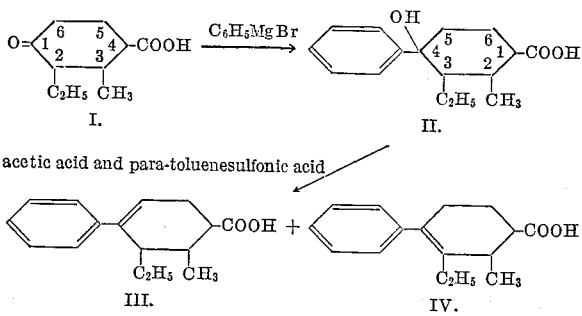

In the reaction sequence illustrated above, the compounds are prepared by the reaction of 2-ethyl-3-methyl-4-carboxycyclohexanone (I) with a Grignard reagent, phenylmagnesium bromide, to produce the hydroxyacid (II). 2-ethyl-3-methyl-4-carboxycyclohexanone is prepared according to U.S. Patent No. 2,582,253. The hydroxyacid (II) may be converted to 2-methyl-3-ethyl-4-phenyl-4-cyclohexenecarboxylic acid (III) and 2-methyl-3-ethyl-4-phenyl-3-cyclohexenecarboxylic acid (IV) by dehydration with hot glacial acetic acid and para-toluenesulfonic acid.

In the reaction sequence illustrated, the starting compound is 2-ethyl-3-methyl-4-carboxycyclohexanone. Other typical compounds which may be used are:

2,3-dimethyl-4-carboxycyclohexanone,
2,3-diethyl-4-carboxycyclohexanone,
2-methyl-3-ethyl-4-carboxycyclohexanone,
2-ethyl-3,3-dimethyl-4-carboxycyclohexanone,
2-methyl-3,3-dimethyl-4-carboxycyclohexanone,
2-ethyl-3-methyl-4-carboxycyclohexanone ethyl ester,
2,3-dimethyl-4-carboxycyclohexanone ethyl ester,
2,3-diethyl-4-carboxycyclohexanone ethyl ester,
2-methyl-3-ethyl-4-carboxycyclohexanone ethyl ester,
2-ethyl-3,3-dimethyl-4-carboxycyclohexanone ethyl ester,
2-methyl-3,3-dimethyl-4-carboxycyclohexanone ethyl ester,
2-ethyl-3-methyl-4-carboxycyclohexanone octyl ester,
2,3-dimethyl-4-carboxycyclohexanone octyl ester,
2,3-diethyl-4-carboxycyclohexanone octyl ester,
2-methyl-3-ethyl-4-carboxycyclohexanone octyl ester,
2-ethyl-3,3-dimethyl-4-carboxycyclohexanone octyl ester, and
2-methyl-3,3-dimethyl-4-carboxycyclohexanone octyl ester.

The antilittering activity of 2-methyl-3-ethyl-4-phenyl-4-cyclohexenecarboxylic acid and of ethinyl estradiol was determined according to the following procedure:

An experimental group of rats composed of 10 females and 4 males was segregated. The compounds to be tested were mixed with a basic diet, Purina Laboratory Chow, and the segregated rats of both sexes were fed with the basic diet containing the compound to be tested for a period of 7 days. The rats were then cohabitated at a ratio of 2 males to 5 females per cage and allowed to copulate freely for a period of 15 days during which time they were fed the basic diet containing the compound to be tested. The sexes were then segregated and fed the basic diet only. A control group of animals were treated identically except that the basic diet did not contain the compound to be tested. The actual consumption by the rats of the compound to be tested was calculated from records of food intake. Littering during the 21-day period following the period of cohabitation was observed. At the end of the 21-day period, the male and female rats were again cohabitated in a ratio of 2 males to 5 females per cage and littering was observed in order to determine if the drug had any lasting effect on the ability of the rats to litter.

The minimum amounts of 2-methyl-3-ethyl-4-phenyl-4-cyclohexenecarboxylic acid and ethinyl estradiol which prevented littering in rats were 0.011 and 0.010 milligram per kilogram of body weight per day, respectively. Neither 2 - methyl - 3-ethyl-4-phenyl-4-cyclohexenecarboxylic acid nor ethinyl estradoil had any lasting effect on the ability of rats to litter.

The following examples are given by way of illustration only and are not to be construed as limiting.

EXAMPLE I

*2-methyl-3-ethyl-4-phenyl-4-hydroxycyclohexane-carboxylic acid*

A solution of 11.7 grams (0.0635 mole) of 2-ethyl-3-methyl-4-carboxycyclohexanone in 90 ml. of dry tetrahydrofuran is added over a period of four minutes to a stirred solution of phenyl-magnesium bromide in 50 ml. of dry ether and 120 ml. of dry tetrahydrofuran, prepared from 20 ml. (0.189 mole) of bromobenzene. The temperature of the reaction mixture during the addition is kept below —25° C. After addition is complete, the reaction mixture is brought to reflux temperature over a period of 45 minutes, and boiled under reflux for 30 minutes. The reaction mixture is then cooled to —30° C. and 100 ml. of aqueous, saturated ammonium chloride solution is slowly added. The reaction mixture is acidified with concentrated hydrochloric acid and the aqueous layer is removed and extracted with 90 ml. of ethyl acetate and this extract is added to the non-aqueous layer. The combined non-aqueous layers are shaken with 150 ml. of half-saturated, aqueous sodium chloride solution, then concentrated under vacuum to a volume of about 50 ml. Fifty ml. of ether is added to the concentrate and the resulting solution is extracted with 65 ml. of normal, aqueous sodium hydroxide solution and then with 70 ml. of half-normal, aqueous sodium hydroxide solution (a total of 0.1 mole) and finally with 50 ml. of water. The combined aqueous extracts are acidified with dilute hydrochloric acid and extracted three times with 50 ml. amounts of methylene chloride. The combined extracts are washed with water and filtered through a mixture of equal parts of Nuchar and magnesium sulfate. The solvent is removed under vacuum at room temperature from the filtrate, leaving a residue of 9.3 grams of crude 2-methyl-3-ethyl - 4 - phenyl - 4 - hydroxycyclohexanecarboxylic acid.

EXAMPLE II

*2-methyl-3-ethyl-4-phenyl-4-cyclohexenecarboxylic acid and 2-methyl-3-ethyl-4-phenyl-3-cyclohexenecarboxylic acid*

The 9.3 grams of crude 2-methyl-3-ethyl-4-phenyl-4-hydroxycyclohexanecarboxylic acid (prepared as in Example I) is dissolved in 95 ml. of hot glacial acetic acid and brought to boiling temperature. One-half gram of para-toluenesulfonic acid is added and the solution is boiled for 13 minutes. Seventy-eight ml. of warm water is added and the solution is allowed to cool, then chilled to −5° C. The crystalline product which forms is removed by filtration, washed with 5 ml. of a cold fifty percent aqueous solution of acetone and then with 5 ml. of hexane. After drying, 2.9 grams of a crude crystalline mixture of 2-methyl-3-ethyl-4-phenyl-4-cyclohexenecarboxylic acid and 2-methyl-3-ethyl-4-phenyl-3-cyclohexenecarboxylic acid is obtained. The crude crystalline material is dissolved in 50 ml. of hot acetone and filtered through Nuchar. Thirty-five ml. of hot water is added to the hot filtrate to produce slight turbidity; the resulting solution is allowed to cool slowly to room temperature. Colorless needles of 2-methyl-3-ethyl-4-phenyl-4-cyclohexenecarboxylic acid form and are removed by filtration. The crystalline material (1.85 g.) has a melting point of 158°–163° C.

*Analysis.*—Calcd. for $C_{16}H_{20}O_2$: C, 78.65; H, 8.25. Found: C, 78.47; H, 8.23.

The filtrate from above is concentrated to 20 ml. by boiling and then allowed to cool slowly, and finally is chilled to −5° C. Diamond-shaped prisms (0.41 g.) of 2-methyl-3-ethyl-4-phenyl-3-cyclohexenecarboxylic acid form and are removed by filtration and washed with 5 ml. of hexane. The crystalline material has a melting point of 137°–144° C.

EXAMPLE III

*Sodium salt of 2-methyl-3-ethyl-4-phenyl-4-cyclohexenecarboxylic acid*

Fifteen grams of 2-methyl-3-ethyl-4-phenyl-4-cyclohexenecarboxylic acid is dissolved in 100 ml. of tetrahydrofuran in a 500 ml. suction flask. The solution is swirled while adding a freshly-made solution of 2.50 grams of sodium hydroxide in 15 ml. of distilled water and 50 ml. of methanol. The solution is concentrated under vacuum to leave 16.5 grams of a white solid which upon recrystallization yields a first crop of 10.55 grams of the sodium salt of 2-methyl-3-ethyl-4-phenyl-4-cyclohexenecarboxylic acid. M.P. 268°–270°.

EXAMPLE IV

*Methyl 2-methyl-3-ethyl-4-phenyl-4-cyclohexenecarboxylate*

Sixty-six grams of the sodium salt of 2-methyl-3-ethyl-4-phenyl-4-cyclohexenecarboxylic acid (prepared according to Example III), 2 ml. of 10 N. aqueous sodium hydroxide and 250 ml. of dimethylformamide is placed in a 1-liter suction flask. The mixture is stirred while adding 25.2 ml. of dimethyl sulfate. Stirring is continued for twenty minutes and to the mixture is added 400 ml. of a distilled water and ice mixture containg 0.5 gram of potassium carbonate. The mixture is permitted to stand for an hour at −5°, after which it is filtered, washed with water and dried in air overnight. There is thus obtained an 86% yield of methyl 2-methyl-3-ethyl-4-phenyl-4-cyclohexenecarboxylate in the form of coarse white parallelopipedons, M.P. 51°–62°.

Following the same procedure (2-methyl-3-ethyl-4-pared methyl 2-methyl-3-ethyl-4-phenyl-3-cyclohexenecarboxylate M.P. 67.5°–69°, and the corresponding lower alkyl esters.

EXAMPLE V

*(2-methyl-3-ethyl-4-phenyl-4-cyclohexenyl)methanol*

Two grams of 2-methyl-3-ethyl-4-phenyl-4-cyclohexenecarboxylic acid and 30 ml. of tetrahydrofuran are placed in a 125 ml. suction flask. To the mixture is added 600 mg. of lithium aluminum hydride. An exothermic reaction takes place. Upon cooling, the resultant lumps are crushed and permitted to stand overnight. The reaction product is poured, with stirring, into an 800 ml. beaker containing 250 ml. of 5% hydrochloric acid mixed with ice. Three methylene chloride extractions are made, which on concentration under vacuum yield 1.95 grams of (2-methyl-3-ethyl-4-phenyl-4-cyclohexenyl)methanol in the form of a cloudy, yellow viscous syrup, B.P. 101°/25 μ.

Following the same procedure (2-methyl-3-ethyl-4-phenyl-3-cyclohexenyl)methanol is prepared from 2-methyl-3-ethyl-4-phenyl-3-cyclohexenecarboxylic acid.

EXAMPLE VI

*2-methyl-3-ethyl-4-phenyl-4-cyclohexenecarboxaldehyde*

To a 250 ml. flask there are added 1.0 gram of (2-methyl-3-ethyl-4-phenyl-4-cyclohexenyl)methanol, as prepared in Example V, 100 ml. of methylene chloride and 40 grams of activated manganese dioxide. The suspension is stirred at room temperature for 20 hours. An additional 10 grams of activated manganese dioxide is added and stirring is continued for a further 20 hours. The mixture is filtered and washed with methylene chloride. Upon concentration, there is obtained 850 mg. of orange-yellow syrup. Trituration with 50 ml. of pentane leaves 230 mg. of a by product. The pentane portion is concentrated under vacuum to give 630 mg. of 2-methyl-3-ethyl-4-phenyl-4-cyclohexenecarboxaldehyde as a yellow oil. Following the same procedure, 2-methyl-3-ethyl-4-phenyl-3-cyclohexenecarboxaldehyde is prepared from (2-methyl-3-ethyl-4-phenyl-3-cyclohexenyl)methanol.

EXAMPLE VII

*2-methyl-3-ethyl-4-phenyl-4-cyclohexene-carboxypyrrolidide*

In a 20 ml. vial, 235 mg. of 2-methyl-3-ethyl-4-phenyl-4-cyclohexenecarboxylic acid is converted to its acid chloride by reaction with thionyl chloride. The acid chloride is dissolved in 2 ml. of methylene chloride and this solution is added to 12 drops of pyrrolidine while rinsing with methylene chloride. The vial is heated to remove most of the solvent. The residue is dissolved in hexane and dilute aqueous ammonium acetate and is given a potassium bicarbonate wash followed by filtration through anhydrous potassium carbonate. Concentration under a nitrogen jet gives 260 mg. of straw yellow oil which crystallizes on scratching. The crystals are pressed on a tile with a few drops of pentane. There is obtained 162 mg. of 2-methyl-3-ethyl - 4 - phenyl - 4 - cyclohexenecarboxypyrrolidide. M.P. 101°–106°.

Following the same procedure, 2-methyl-3-ethyl-4-phenyl-3-cyclohexenecarboxypyrrolidide is prepared from 2-methyl-3-ethyl-4-phenyl-3-cyclohexenecarboxylic acid.

EXAMPLE VIII

*2-methyl-3-ethyl-4-phenyl-3-cyclohexenecarboxamide*

In a 12 ml. vial, 488 mg. of 2-methyl-3-ethyl-4-phenyl-3-cyclohexenecarboxylic acid is converted to its acid chloride with thionyl chloride. Excess thionyl chloride is removed by evacuation. The acid chloride is added, with swirling, to a 125 ml. suction flask containing 20 ml. of 1,2-dimethoxyethane to which liquid ammonia is added until the mixture is bubbling vigorously. The mixture is chilled in a −5° bath. The mixture is shaken for ten minutes at room temperature and 75 ml. of distilled water is added with swirling. The mixture is permitted to stand overnight at 0° and is filtered with water washes. Upon drying under vacuum, 390 mg. of fine granular white powder is obtained. Upon recrystallization there is obtained 330 mg. of 2-methyl-3-ethyl-4-phenyl-3-cyclohexenecarboxamide. M.P. 146°–148°.

EXAMPLE IX

*1-(α-methoxycyclopentoxy)methyl-2-methyl-3-ethyl-4-phenyl-4-cyclohexene*

Seven-tenths of one gram of (2-methyl-3-ethyl-4-phenyl-4-cyclohexenyl)-methanol, as obtained in Example V, is dissolved in 7 ml. of chloroform. To this solution is added 1.4 ml. of cyclopentanone dimethyl ketal, three drops of methanol and 2 mg. of sulphosalicylic acid. The lemon-yellow solution is heated on a steam bath for thirteen minutes, until foaming decreases and the color becomes slightly brownish. The solution is made alkaline with two drops of N-ethylmorpholine, is evacuated to remove chloroform and is diluted with 20 ml. of ammoniacal water. The methylene chloride extracts are filtered through anhydrous potassium carbonate and concentrated under vacuum to give 1.0 gram of 1-(α-methoxycyclopentoxy)-methyl-2-methyl-3-ethyl-4-phenyl-4-cyclohexene as a yellow syrup.

EXAMPLE X

*1-(tetrahydro-2-pyranyloxy)methyl-2-methyl-3-ethyl-4-phenyl-4-cyclohexene*

Sixty mg. of (2-methyl-3-ethyl-4-phenyl-4-cyclohexenyl)-methanol, as obtained in Example V, is dissolved in 9 ml. of dry 1,2-dimethoxyethane and 0.92 ml. of 2,3-dihydropyran. One-half drop of 3 N. hydrochloric acid is added as a catalyst and the solution is heated at 50° for 3½ hours. After concentration under vacuum, there is added to the residue 3 drops of N-ethyl-morpholine and 15 ml. of ammoniacal water. The oil layer which is formed is extracted with methylene chloride and the extract is filtered through anhydrous potassium chloride. The filtrate is concentrated to yield 0.80 gram of 1-(tetrahydro-2-pyranyloxy)methyl-2 - methyl - 3 - ethyl - 4-phenyl-4-cyclohexene as a cloudy yellow syrup.

EXAMPLE XI

*2,3-dimethyl-4-phenyl-3-(and 4)-cyclohexene-carboxylic acid*

The lithium salt of 2,3-dimethyl-4-carboxycyclohexanone is prepared as follows:

Ninety millimoles of 2,3-dimethyl-4-carboxycyclohexanone in 80 ml. of dry tetrahydrofuran is neutralized with 90 millimoles of lithium hydride. In a 500 ml. 3-necked flask with stirrer is placed 81 ml. of 3-molar ethereal phenylmagnesium bromide and to this is added 130 ml. of dry tetrahydrofuran. With stirring, 17 grams of the lithium salt of 2,3-dimethyl-4-carboxycyclohexanone in 110 ml. of dry tetrahydrofuran is added to the flask. The mixture is stirred and boiled under reflux for 30 minutes. The mixture is chilled and hydrolyzed by the addition of 122 ml. of 3 N. hydrochloric acid. The organic layer is washed with water and extracted with sodium hydroxide.

The alkaline extracts are acidified with concentrated hydrochloric acid to pH 1. The solution is extracted with methylene chloride and filtered through Nuchar and anhydrous magnesium sulfate to yield 28 grams of a golden yellow syrup.

The syrup is dehydrated by boiling in 90 ml. of acetic acid containing 200 mg. of iodine. After seven minutes of boiling, 60 ml. of water containing 150 mg. of sodium bisulfite is added. During cooling, 30 ml. of acetone is gradually added. The solution is extracted with methylene chloride and the extract is separated by chromatography on silicic acid into two fractions. Fractional crystallization yields 175 mg. of 2,3-dimethyl-4-phenyl-3-cyclohexenecarboxylic acid, M.P. 145°–150°, and 340 mg. of 2,3-dimethyl-4 - phenyl - 4 - cyclohexenecarboxylic acid, M.P. 120°–126°.

What is claimed is:

1. A compound selected from the group consisting of:

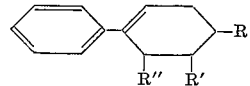

and

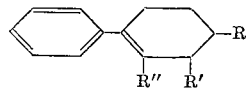

wherein R is selected from the group consisting of formyl, carboxy, lower carbalkoxy, methanol, carboxamide and carboxylic alkali metal salts, R' is selected from the group consisting of methyl, dimethyl and ethyl, and R'' is selected from the group consisting of methyl and ethyl.

2. A compound according to claim 1 selected from the group consisting of 2-methyl-3-ethyl-4-phenyl-4-cyclohexenecarboxylic acid and 2-methyl-3-ethyl-4-phenyl-3-cyclohexenecarboxylic acid.

3. A compound according to claim 1 selected from the group consisting of methyl 2-methyl-3-ethyl-4-phenyl-4-cyclohexenecarboxylate and methyl 2-methyl-3-ethyl-4-phenyl-3-cyclohexenecarboxylate.

4. A compound according to claim 1 selected from the group consisting of (2-methyl-3-ethyl-4-phenyl-4-cyclohexenyl)methanol and (2-methyl-3-ethyl-4-phenyl-3-cyclohexenyl)methanol.

5. A compound according to claim 1 selected from the group consisting of 2-methyl-3-ethyl-4-phenyl-4-cyclohexenecarboxaldehyde and 2-methyl-3-ethyl-4-phenyl-3-cyclohexenecarboxaldehyde.

6. A compound according to claim 1 selected from the group consisting of 2-methyl-3-ethyl-4-phenyl-4-cyclohexenecarboxypyrrolidide and 2-methyl-3-ethyl-4-phenyl-3-cyclohexenecarboxypyrrolidide.

7. A compound according to claim 1 selected from the group consisting of 2,3-dimethyl-4-phenyl-4-cyclohexene-carboxylic acid and 2,3-dimethyl-4-phenyl-3-cyclohexene-carboxylic acid.

8. A compound according to claim 1 selected from the group consisting of the sodium salt of 2-methyl-3-ethyl-4-phenyl-4-cyclohexenecarboxylic acid and the sodium salt of 2 - methyl - 3 - ethyl - 4-phenyl-3-cyclohexenecarboxylic acid.

9. 2-methyl-3-ethyl-4-phenyl-3-cyclohexene - carboxamide according to claim 1.

References Cited

Deno et al., J. Am. Chem. Soc., vol. 74, pp. 3233–36 (1952).

Meek et al., J. Am. Chem. Soc., vol. 73, pp. 5563–5 (1951).

ALEX MAZEL, *Primary Examiner.*

J. TOVAR, *Assistant Examiner.*

UNITED STATES PATENT OFFICE
CERTIFICATE OF CORRECTION

Patent No. 3,344,147                      September 26, 1967

Alexander Mebane

It is hereby certified that error appears in the above numbered patent requiring correction and that the said Letters Patent should read as corrected below.

Column 4, line 11, for "Following the same procedure (2-methyl-3-ethyl-4-" read -- Following the procedure of Example IV, there are pre- --.

Signed and sealed this 29th day of October 1968.

(SEAL)
Attest:

Edward M. Fletcher, Jr.                      EDWARD J. BRENNER
Attesting Officer                              Commissioner of Patents